United States Patent [19]
Friedheim

[11] 3,856,971
[45] Dec. 24, 1974

[54] METHOD OF COMBATING FILARIASIS IN DOGS

[76] Inventor: Ernst A. H. Friedheim, 5, Ave. Marc Monnier, Geneva, Switzerland

[22] Filed: July 18, 1973

[21] Appl. No.: 380,364

Related U.S. Application Data

[63] Continuation-in-part of Ser. No. 339,843, March 9, 1973.

[52] U.S. Cl. ............................................. 424/297
[51] Int. Cl. .............................................. A61k 27/00
[58] Field of Search ................................... 424/297

[56] References Cited
UNITED STATES PATENTS

| | | | |
|---|---|---|---|
| 2,232,232 | 2/1941 | Herrmann et al. | 424/297 |
| 2,593,434 | 4/1952 | Friedheim | 424/297 |
| 2,659,723 | 11/1953 | Friedheim | 424/297 |

*Primary Examiner*—Sam Rosen
*Attorney, Agent, or Firm*—Stevens, Davis, Miller & Mosher

[57] ABSTRACT

Method of combating filariasis due to D. immitis in dogs, comprising administering to a dog a pharmaceutically effective amount of a compound of the formula

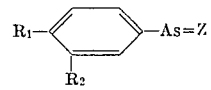

wherein Z is oxygen or a group of the formula

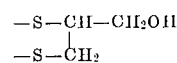

or Z represents two groups of the formula

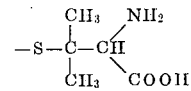

$R_1$ is -OH, -NH.CO.$NH_2$, -CO.$NH_2$, -$CH_2$-CO.$NH_2$ and $R_2$ is hydrogen, -$NH_2$ or -NH.CO.$CH_3$.

10 Claims, No Drawings

METHOD OF COMBATING FILARIASIS IN DOGS

This application is a continuation-in-part of copending application Ser. No. 339,843, filed Mar. 9, 1973.

The present invention is concerned with a method of combating filariasis due to D. immitis in dogs by administering to a dog certain arsenic compounds as defined hereafter.

The causal treatment of diseases caused by filaria requires according to the present state of science, two drugs, one of which acts upon the adult worms (macrofilaria) and the other on the embryonic forms (microfilaria). For the destruction of the adult worms preparations containing arsenic are available, but they are limited in their use in as far as they have to be applied via the parenteral route. Two currently used compounds, thioacetarsamide and oxychlorophenarsin (Mapharsen) have to be applied strictly intravenously, because they produce inflammatory reactions and necrosis when applied to subcutanous and intramuscular fashion.

It is an object of this invention to provide an effective drug against filariasis in the dog, which drug can be given orally.

It has now been found that certain phenylarsenoxides and their mercaptides, when given orally, are well tolerated in therapeutic doses by dogs and kill the adult worms of Dirafilaria immitis in the blood of infected dogs.

According to the present invention, the method of combating filariasis due to D. immitis in dogs comprises administering to a dog a pharmaceutically effective amount of a compound of the formula I

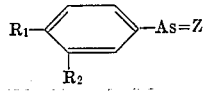

wherein Z is oxygen or a group of the formula

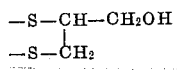

or Z represents two groups of the formula

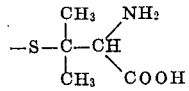

$R_1$ is -OH, -NH.CO.NH$_2$, -CO.NH$_2$, -CH$_2$-CO.NH$_2$ and $R_2$ is hydrogen, -NH$_2$ or -NH.CO.CH$_3$ The new technical effect achieved by oralmacrofilaricidal therapy consists of the practical advantages of a therapy obviating the use of syringes and injections under aseptic conditions requiring trained personnel.

A further advantage of the present invention is presented by particular galenic forms allowing orally active macrofilaricidal agents to be applied together with orally active microfilaricidal agents such as the compounds known under the names of Diethylcarbamazine (Hetrazan) and Dithazanine dithazanine Iodide, as well as the optical isomers of Tetramisole (Merck Index 1968, 1029)

The compounds according to formula I can be applied, as dry powder in bulk, or contained in capsules, tablets, dragées, or dissolved or suspended or emulgated in a pharmaceutically acceptable liquid nonaqueous medium, e.g. propyleneglycol, ethyl-oleate, benzyl alcohol, salicylic alcohol (Saligenine) oils including olive-, sesame, cottonseed, peanut oil, and mixtures thereof, if desired with additives affecting advantageously dispersion, emulsion, stability, taste.

For oral application the compounds according to formula I may be mixed in to the food of the animals to be treated, in form of dry powder, or in solution, suspension, emulsion as stated in the foregoing paragraph, if desired with a taste improving additive.

Solutions in propyleneglycol are added to the food preferably after dilution with 1-10 volumes of water.

In a preferred form of the present invention the macrofilaricidal compounds according to formula I may be mixed with microfilaricidal agents, e.g. Diethylcarbamazine or Dithazanine for simultaneous oral application, in dry state or in solution, suspension, emulsion in organic liquids as stated above.

It is understood that the quantities and concentrations of compounds according to formula I when applied as such may vary in wide limits, e.g. between 0.05 and 0.60 g per unit of dry powder in capsules, tablets, dragées, and the concentrations in solutions and suspensions etc. e.g. between 0.1 and 6.0 percent.

The proportion of compounds according to formula I and microfilaricidal compounds, e.g. Diethylcarbamazine and Dithazanine Iodide, in mixtures, may range from 1:1 to 1:10 or 1:1 to 10:1.

The dosage for the oral treatment of canine filariasis with compounds of formula I ranges from 2-50 mg/kg for the single dose. The dosage of Diethylcarbamazine is known to range from 50-100 mg/kg, and the dosage of Dithazanine 5-10 mg/kg for the single dose in canine filariasis. Tetramisole dosage 2-10 mg/kg.

Examples for oral macrofilaricidal activity of compounds according to formula I are recorded in table I. It appears that these compounds reduce the number of living adult worms significantly, in certain cases to zero.

These compounds have little direct effect on microfilaria.

The microfilaricidal effect of Diethylcarbamazine and Dithazanine iodide are known.

The macrofilaricidal oral application of compounds according to formula I, can be associated with parenteral applications of microfilaricidal agents such as Hoe 33 258 and fention (Bayer 29 493, Baytex etc).

TABLE

Number of living specimens of Dirafilaria immitis found at autopsy of naturally infected dogs, 35 days after oral treatment with a substituted phenylarsenoxide or mercaptides thereof with one dose a day for 5 consecutive days. Dogs were killed at the end of the observation period with intravenous phenobarbital.

| dog No | kg | substance | Single dose mg/kg | living filaria p.m. m | f | total |
|---|---|---|---|---|---|---|
| 7 | 19.1 | Arsenamid B | 5 | 21 | 17 | 33 |
| 8 | 9.5 | do. | 10 | 18 | 2 | 20 |
| 9 | 21.1 | Carbason B | 10 | 14 | 5 | 19 |
| 10 | 23 | do. | 20 | 9 | 2 | 11 |
| 11 | 17 | Mapharsen | 2 | 23 | 16 | 39 |
| 12 | 15 | do. | 4 | 16 | 5 | 21 |
| 13 | 18 | Mapharsen B | 3 | 33 | 16 | 49 |

| dog No | kg | substance | Single dose mg/kg | living filaria p.m. m | f | total |
|---|---|---|---|---|---|---|
| 14 | 19.5 | do. | 6 | 4 | 0 | 4 |
| 15 | 20.7 | — | — | 18 | 13 | 31 |
| 16 | 21.4 | — | — | 22 | 28 | 40 |
| 17 | 18.9 | — | — | 10 | 10 | 20 |
| 18 | 22.3 | — | — | 6 | 7 | 13 |

The various compounds mentioned above have the following formulas:

Arsenamid B___ 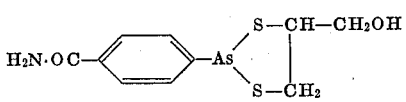

Carbarson B___ 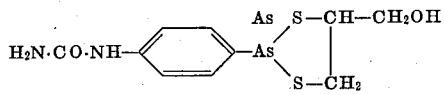

Mapharsen____ 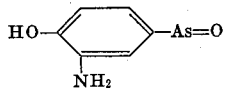

Mapharsen B___ 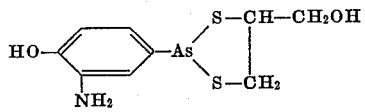

Diethylcarbamazine = 1-diethylcarbamoyl-4-methyl-piperazine
Dithazanine = 3,3'-diethyl-thiadicarboxycyanine (iodide).

The abovementioned Arsenamide B is a novel compound. It can be prepared by reacting p-carboxamidophenyl arsenoxide with 2,3-dimercaptopropanol-1. A more suitable manner for preparing Arsenamide B consists in reacting a dithioglycolate of p-carboxamidophenyl arsenoxide with 2,3-dimercaptopropanol-1. The reaction scheme is as follows:

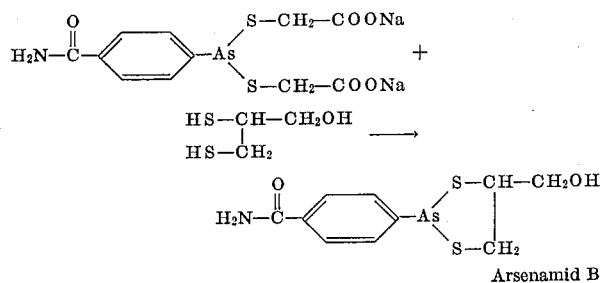

EXAMPLE 50 g (0.13 mol) of bis(carboxymethylmercapto)(p-carbamoylphenyl)arsine (known as "Caparsolate") are dissolved in 800 ml MeOH and 37 ml concentrated aqueous ammonia, to give a solution of pH 8–9. 16.5 g 2,3-dimercaptopropanol (0,13 mol) dissolved in 40 mol MeOH are added. The filtered solution is run with stirring into 3,000 ml of icewater. The white precipitate formed is filtered off, washed with 25 percent aqueous MeOH and dried in vacuum. Yield: 30 g. The product is Arsenamide B of the formula indicated above. It is a white crystaline powder, insoluble in water, cold MeOH, EtOH, acetone, ether, chloroform, sparingly soluble in hot MeOH, EtOH, soluble in dimethylformamide, dimethylsulfoxide, glacial acetic acid.

TABLETS a. 1 part by weight of Arsenamide B and 5 parts by weight of a pharmaceutical acceptable filler (excipient), preferably starch, are mechanically blended and worked with water into a paste. In a conventional procedure the paste is granulated by passing through a mesh and the dried granules are fed into a tableting machine set to produce tablets containing 50, 100 and 200 mg of Arsenamide B.

The proportion of active ingredient to filler may be varied from 1:1 to 1:30. Other fillers may be used including lactose, talc, caseine. Other liquids than water may be used for granulating including alcohol and acetone, and mixtures of alcohol and acetone with water. Under appropriate mechanical conditions the step of granulating may be omitted and the mixture of active ingredient and filler compressed directly, with or without addition of a binder such as gum arabic, to tablets. The weight of active ingredient per tablet may range from 50-500 mg. The tablets may be coated by conventional procedures, including coatings preventing the disintegration of the tablets in the stomach.

The tablets may be made to contain an addition to compounds according to formula I, other filaricidal agents including Hetrazan, Dithiazanine Iodide and Levamisole.

b. 1 part by weight of Arsenamide and 1 part by weight of Levamisole are blended with 10 parts by weight of lactose, worked to a paste with 50 percent alcohol, granulated and tableted as in the preceding example a), to tablets containing 50, 100 or 200 mg of each of the two active ingredients.

In the foregoing examples a) and b) Arsenamide B may be replaced by other compounds according to formula I, including Carbasone B, and Levamisole may be replaced by Hetrazan and Dithiazanine Iodide.

I claim:

1. A method of combating filariasis due to D. immitis in dogs, comprising orally administering to an infected dog a pharmaceutically effective amount of a compound of the formula I

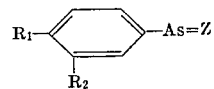   I wherein Z is oxygen or a group of the formula

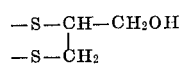

or Z represents two groups of the formula

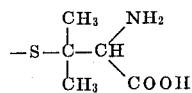

$R_1$ is -OH, -NH.CO.NH$_2$, -CO.NH$_2$, -CH$_2$-CO.NH$_2$ and $R_2$ is hydrogen, -NH$_2$ or -NH.CO.CH$_3$.

2. The method according to claim 1, wherein said compound has the formula

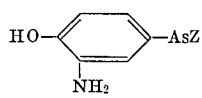

Z being defined as aforesaid.

3. The method according to claim 1, wherein said compound has the formula

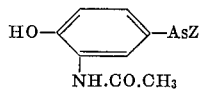

Z being defined as aforesaid.

4. The method according to claim 1, wherein said compound has the formula

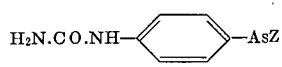

Z being defined as aforesaid.

5. The method according to claim 1, wherein said compound has the formula

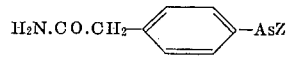

Z being defined as aforesaid.

6. The method according to claim 1, wherein said compound has the formula

H₂N.CO.CH₂—⟨ ⟩—AsZ

Z being defined as aforesaid.

7. The method according to claim 6, wherein said compound is admixed to a pharmaceutically acceptable carrier.

8. The method according to claim 7, wherein said compound and carrier are in the form of capsules, tablets, sprinkable powders, solutions, emulsions or suspensions for oral administration.

9. The method according to claim 7, wherein said compound is further admixed with a pharmaceutically effective amount of another filaricidal agent.

10. The method according to claim 9, wherein said other agent is Diethylcarbamazine, Dithazanine or Tetramisole.

* * * * *